E. E. JONES.
STARTING MECHANISM FOR INTERNAL COMBUSTION MOTORS.
APPLICATION FILED AUG. 2, 1915.
1,220,853.
Patented Mar. 27, 1917.
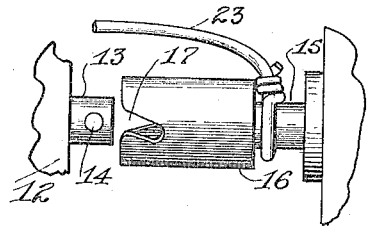
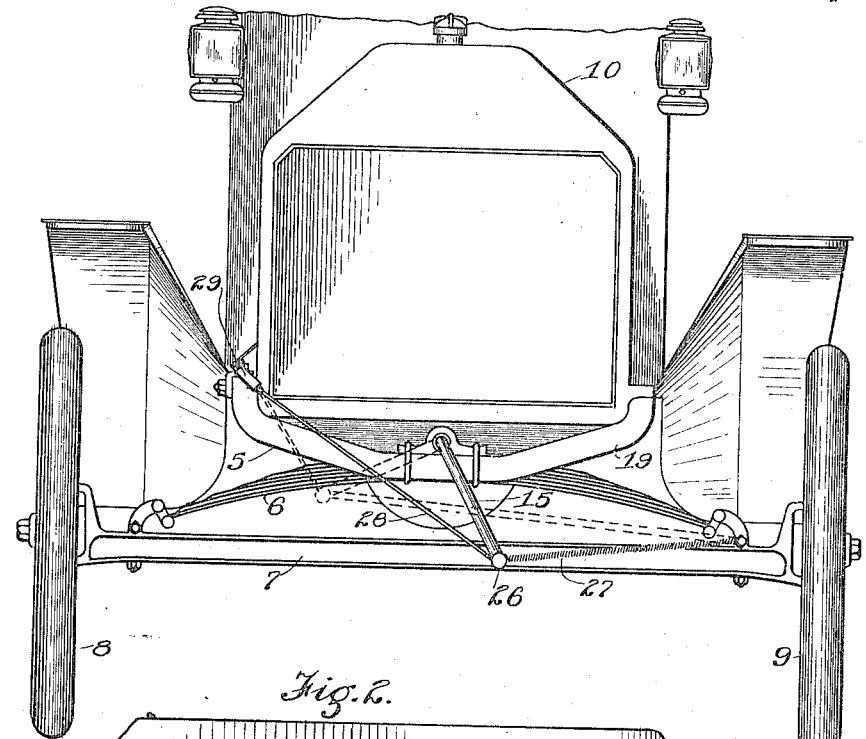
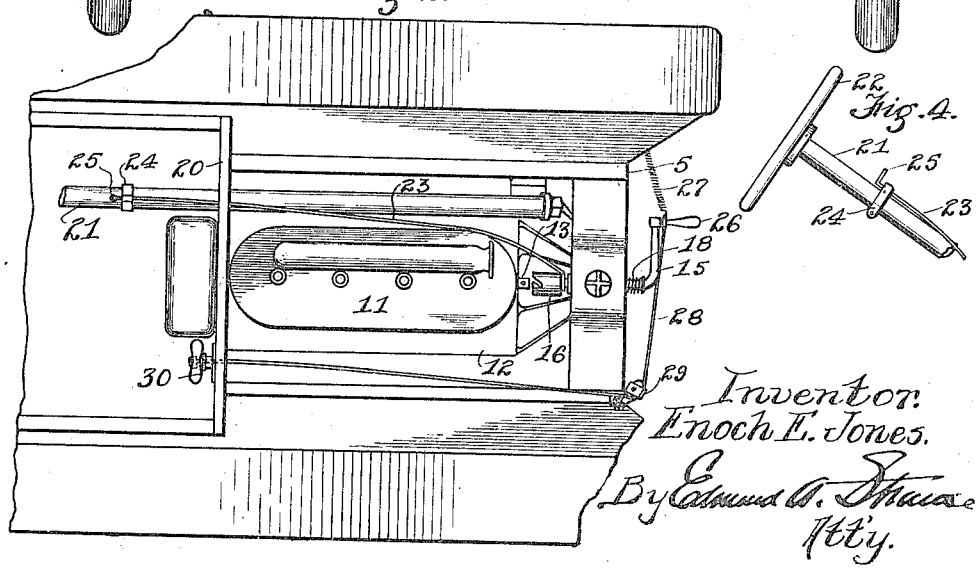
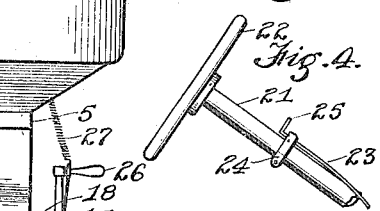
Inventor:
Enoch E. Jones.
By Edmund A. Strause
Att'y.

UNITED STATES PATENT OFFICE.

ENOCH E. JONES, OF LOS ANGELES, CALIFORNIA.

STARTING MECHANISM FOR INTERNAL-COMBUSTION MOTORS.

1,220,853.

Specification of Letters Patent.

Patented Mar. 27, 1917.

Application filed August 2, 1915. Serial No. 43,274.

*To all whom it may concern:*

Be it known that I, ENOCH E. JONES, a citizen of the United States, residing at Los Angeles, in the county of Los Angeles and State of California, have invented new and useful Improvements in Starting Mechanism for Internal-Combustion Motors, of which the following is a specification.

This invention relates to a starting mechanism for internal combustion motors, and pertains especially to a starter for automobile motors.

It is an object of this invention to provide a mechanical starter which is simple in construction and may be operated at a distance from the engine.

It is another object of this invention to provide a starter adapted for automobiles and which does not require the removal of the hand crank from the car.

I attain these objects by means of the mechanism illustrated in the accompanying drawing, in which:

Figure 1 is a front elevation of an automobile.

Fig. 2 is a fragmentary view in plan of the front part with the hood removed.

Fig. 3 is an enlarged fragmentary detail of the clutch.

Fig. 4 is a side elevation of the steering wheel, post, and the means for operating the clutch.

More specifically, 5 indicates the frame of an automobile of the Ford type. The body portion mounted on the frame is supported at the front end by a spring 6 mounted upon an axle 7. Axle 7 is provided at its ends with a steering knuckle mechanism for the front wheels 8 and 9. The hood for the engine is indicated by 10. Mounted upon the frame 5 is the engine 11 provided with a crank case 12 and a crank shaft 13 which extends outside of the crank case. Crank shaft 13 has diametrically disposed pins, one of which is indicated by 14. The usual crank 15 is provided with a socket clutch 16 having spiral grooves 17 adapted to receive the pins 14 and thereby clutch the engine crank shaft 13 and the hand crank 15. A spring 18 surrounds the clutch end of the crank 15 and abuts the front rail 19 of the frame, thereby tending to force the crank 15 outwardly and release the clutch. The unclutched position is shown in Fig. 3. The usual dash is indicated by 20. The steering post 21 equipped with the steering wheel 22 is conveniently mounted in the body. The construction so far described is of the type usual and common in automobiles, and especially in the Ford automobile.

The feature of my invention comprises a flexible member 23 which is secured to the hand crank 15, extends alongside of the steering post 21, through a guide bracket 24 mounted upon the steering post, and terminates in a finger piece 25 disposed near the steering wheel 22. It will be obvious that a pull upon the finger piece 25 draws the clutch socket 16 toward the crank shaft 13 and clutches the crank 15 with the crank shaft 13. Releasing the finger piece 25 spring 18 will move the crank 15 outwardly and disengage it from crank shaft 13.

Secured to the handle 26 of the hand crank 15 and to the front axle 7 is a helical spring 27, the spring tending to maintain the hand crank in the position indicated in full lines in Fig. 1. A flexible member 28 is roved about a guide pulley 29 which is secured to the frame 5, and then extends toward the seat and through the dash terminating in a hand grip 30.

In order to start the engine the finger piece 25 is gripped and pulled upward throwing the clutch socket 16 into engagement with the crank shaft 13. The hand grip 30 is then grasped and pulled toward the operator as far as it will move. This disposes the hand grip and spring in position shown in dotted lines in Fig. 1. The hand grip should be pulled quickly toward the operator, thus turning over the engine and starting it. The usual priming devices may be installed to assist in the starting of the engine. When the hand grip 30 is released, the spring 27 turns the crank 15 to the position shown in full lines in Fig. 1, and the spring 18 throws the socket 16 out of engagement with the engine crank shaft 13.

What I claim is:

1. A starter for internal combustion engines, comprising the combination with a crank shaft, of a hand crank provided with a socket clutch arranged to be engaged with said shaft by moving it longitudinally thereto, resilient means secured to said crank normally holding the same out of operative engagement with said shaft, flexible means secured to said crank for moving the clutch into engagement with said shaft, flexible means secured to said hand crank for rotating the same, and a spring member secured to said hand crank for retracting the same.

2. A starter for automobile engines, comprising the combination with the engine crank shaft, of a hand crank provided with clutch means arranged to be engaged with said shaft by moving the crank longitudinally thereto, flexible means secured to said clutch means and adapted to extend along the steering post for operatively engaging said shaft and crank, spring means mounted on said crank and engaging the automobile frame tending to hold said clutch out of engagement with said shaft, flexible means secured to said hand crank for rotating the same and adapted to extend through the dash of the automobile, and spring means secured to said hand crank and to the automobile frame to return said crank.

3. A starter for automobile engines, comprising the combination with the engine crank shaft, of a hand crank provided with clutch means arranged to be engaged with said shaft by moving the crank longitudinally thereto, flexible means secured to said clutch means and adapted to extend along the steering post for operatively engaging said shaft and crank, spring means mounted on said crank and engaging the automobile frame tending to hold said clutch out of engagement with said shaft, flexible means secured to said hand crank for rotating the same and adapted to extend to a point accessible to the operator of the automobile, and spring means secured to said hand crank and to the automobile frame to return said crank.

In witness that I claim the foregoing I have hereunto subscribed my name this 2nd day of July, 1915.

ENOCH E. JONES.

Copies of this patent may be obtained for five cents each, by addressing the "Commissioner of Patents, Washington, D. C."